(12) United States Patent
Jia et al.

(10) Patent No.: US 11,550,636 B2
(45) Date of Patent: Jan. 10, 2023

(54) INTERNET OF THINGS SOLUTION DEPLOYMENT IN HYBRID ENVIRONMENT

(71) Applicant: VMware, Inc., Palo Alto, CA (US)

(72) Inventors: Yixing Jia, Beijing (CN); Guang Lu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 385 days.

(21) Appl. No.: 16/683,269

(22) Filed: Nov. 14, 2019

(65) Prior Publication Data
US 2021/0149740 A1    May 20, 2021

(51) Int. Cl.
*G06F 9/50* (2006.01)
*H04L 67/10* (2022.01)
*G06F 8/71* (2018.01)

(52) U.S. Cl.
CPC .............. *G06F 9/5077* (2013.01); *G06F 8/71* (2013.01); *G06F 9/5027* (2013.01); *H04L 67/10* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 10,255,067 B2* | 4/2019 | Noens | H04W 4/70 |
| 10,262,019 B1* | 4/2019 | Reiner | G06F 9/5077 |
| 10,708,135 B1* | 7/2020 | Elliott, IV | G06F 8/60 |
| 10,944,638 B1* | 3/2021 | Chamarajnager | H04W 40/246 |
| 11,356,420 B2* | 6/2022 | Shih | H04L 67/288 |
| 2012/0300017 A1* | 11/2012 | Li | H04N 19/196 348/14.09 |
| 2016/0065653 A1* | 3/2016 | Chen | H04L 41/0813 715/735 |
| 2017/0060615 A1* | 3/2017 | Thakkar | H04L 67/1004 |
| 2017/0373933 A1* | 12/2017 | Subramanian | G06F 9/5072 |
| 2018/0109428 A1* | 4/2018 | Kattepur | H04L 43/0852 |
| 2018/0143825 A1* | 5/2018 | Noens | G06F 8/30 |
| 2018/0234266 A1* | 8/2018 | Rudolph | H04L 65/102 |

(Continued)

OTHER PUBLICATIONS

Jayawardene et al.; "Hybrid approach for enabling hierarchical Fog Networks in an IoT deployment"; IEEE, COMPAC 2019; (Jayawardene_2019.pdf; pp. 1-5) (Year: 2019).*

*Primary Examiner* — Hiren P Patel
(74) *Attorney, Agent, or Firm* — Su IP Consulting

(57) ABSTRACT

Example methods are provided to deploy an Internet of Things (IoT) solution in a hybrid environment. The methods include deploying a first agent application on a first edge gateway of a first vendor by the first edge gateway. The first agent application is configured to collect a first set of information associated with the first edge gateway. The methods include deploying a second agent application on a second edge gateway of a second vendor by the second edge gateway. The second agent application is configured to collect a second set of information associated with the second edge gateway. In response to a determination of a first virtualized computing environment on the first edge gateway or a second virtualized computing environment on the second edge gateway fulfils a first requirement of a template to deploy the IoT solution, the methods include deploying the IoT solution in the first virtualized computing environment, the second virtualized computing environment, or both.

19 Claims, 3 Drawing Sheets

(56) References Cited

U.S. PATENT DOCUMENTS

| | | | |
|---|---|---|---|
| 2018/0246768 A1* | 8/2018 | Palermo | H04L 67/12 |
| 2019/0138318 A1* | 5/2019 | Yang | G06F 15/16 |
| 2019/0140906 A1* | 5/2019 | Furuichi | G06F 16/27 |
| 2019/0149361 A1* | 5/2019 | Sarwar | H04L 41/08 370/254 |
| 2019/0227843 A1* | 7/2019 | Custodio | G06F 9/505 |
| 2019/0363905 A1* | 11/2019 | Yarvis | G06F 8/60 |
| 2020/0050494 A1* | 2/2020 | Bartfai-Walcott | G06F 9/5083 |
| 2020/0177545 A1* | 6/2020 | Shih | H04L 63/0428 |
| 2021/0067605 A1* | 3/2021 | Roth | H04L 67/10 |
| 2021/0144517 A1* | 5/2021 | Guim Bernat | H04L 9/3213 |
| 2021/0409243 A1* | 12/2021 | Yang | H04L 41/0816 |
| 2022/0026882 A1* | 1/2022 | Wang | H04L 67/51 |

\* cited by examiner

INTERNET OF THINGS SOLUTION DEPLOYMENT IN HYBRID ENVIRONMENT

BACKGROUND

Unless otherwise indicated herein, the approaches described in this section are not admitted to be prior art by inclusion in this section.

The Internet of Things (IoT) is a system including networks of devices and objects, such as sensors, actuators, edge gateways and data centers, with the purpose of interconnecting all things in such a way to make the things intelligent, programmable, and more capable of interacting with users and each other. An IoT solution may include hardware components such as sensors, actuators, edge gateways and data centers and software components running on these hardware components. Data may be collected by sensors and transmitted to edge gateways for edge computing and data centers for cloud computing. Data centers and/or edge gateways may generate and transmit commands to actuators based on the computing so that actuators may perform actions according to the commands. Conventional IoT solutions may not be suitable in hybrid environments which integrate software and/or hardware components in the IoT solution from different vendors.

DETAILED DESCRIPTION

Figure 1:
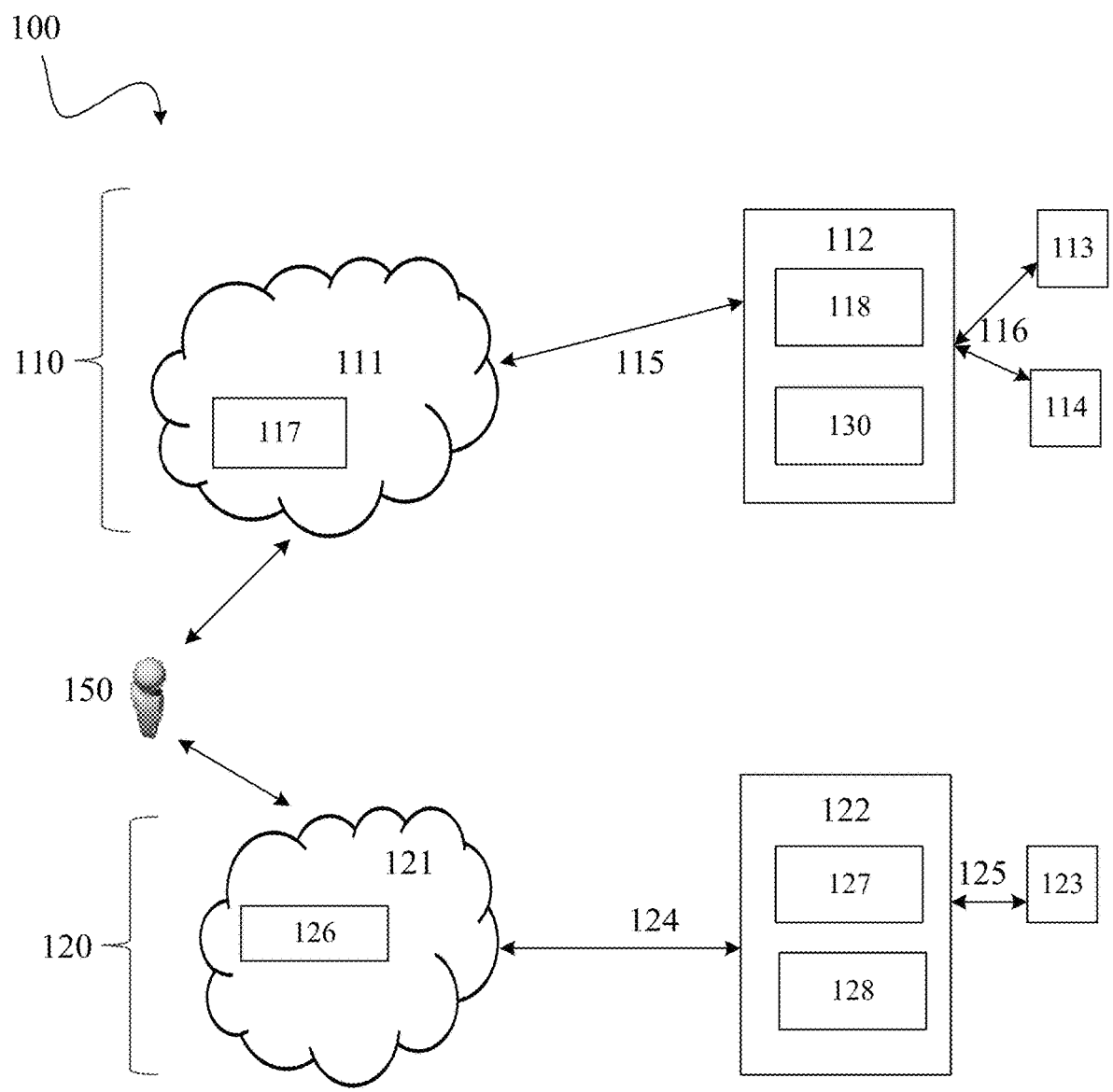
FIG. 1 is a schematic diagram illustrating an example hybrid environment in which one or more IoT solutions are deployed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to an Internet of Things (IoT) solution deployment in a hybrid environment will now be explained in more detail using FIG. 1. FIG. 1 is a schematic diagram illustrating an example hybrid environment 100 in which one or more IoT solutions are deployed. It should be understood that, depending on the desired implementation, hybrid environment 100 may include additional and/or alternative components than that shown in FIG. 1.

In the example illustrated in FIG. 1, a first homogeneous IoT solution 110 and a second homogeneous IoT solution 120 are deployed in hybrid environment 100. In a homogeneous IoT solution, software and/or hardware components are from a single vendor. Homogeneous IoT solution 110 is provided by a first single vendor, and homogenous IoT solution 120 is provided by a second single vendor.

Homogeneous IoT solution 110 may include, but not limited to, data center 111, edge gateway 112, sensor 113, actuator 114, and connections 115 and 116. Homogeneous IoT solution 110 may also include IoT service component 117 deployed in data center 111 and IoT service component 118 deployed in edge gateway 112.

Similarly, homogeneous IoT solution 120 may include, but not limited to, data center 121, edge gateway 122, sensor 123 and connections 124 and 125. Homogeneous IoT solution 120 may also include IoT service component 126 deployed in data center 121 and IoT service components 127 deployed in edge gateway 122.

In some embodiments, edge gateway 112 is disposed close to sensor 113 and actuator 114 and connection 116 is implemented by a relatively short-ranged connection, such as Bluetooth, Wi-Fi, Zigbee or Modbus. Data center 111 is distant from edge gateway 112, sensor 113 and actuator 114 and connection 115 is implemented by a relatively long-ranged connection, such as connections implemented by Hypertext Transfer 2 (HTTP 2) or Message Queuing Telemetry Transport (MQTT). Similarly, edge gateway 122 is close to sensor 123 and data center 121 is distant from edge gateway 122 and sensor 123. Connection 124 is a relatively long-ranged connection while connection 125 is a relatively short-ranged connection.

For illustration only, for example, homogeneous IoT solution 110 is for monitoring and controlling an offshore oil field. Sensor 113 and actuator 114 may be disposed at the offshore oil field. Sensor 113 is configured to detect a pressure of the offshore oil field. Actuator 114 is configured to open a valve to release the pressure. Edge gateway 112 is also disposed at the first offshore oil field. IoT service component 118 is configured to interface and communicate with sensor 113 and actuator 114 through connection 116. Edge gateway 112 is configured to communicate with data center 111. Therefore, pressures detected by sensor 113 may be transmitted to onshore data center 111 through connections 116 and 115. User 150 may access data center 111 through IoT service component 117 to remotely monitor the detected pressure. In response to the detected pressure exceeds a threshold, user 150 may issue a command of opening the valve to release the pressure to cloud 111 through IoT service component 117. Cloud 111 is configured to send the command to edge gateway 112 through connection 115. IoT service component 118 on edge gateway 112 is configured to send the command to actuator 114 through connection 116 so that actuator 114 may open the valve to release pressure according to the command.

For illustration only, for example, homogeneous IoT solution 120 is for monitoring and controlling a chemistry factory. Sensor 123 may be disposed in a remote pipeline of the factory to detect a temperature. Edge gateway 122 is disposed near the remote pipeline but away from a central control room of the factory. IoT service component 127 is configured to interface and communicate with sensor 123 through connection 125. IoT service component 128 has the machine learning capability. Edge gateway 122 is configured to transmit data collected by sensor 123 back to and receive data from data center 121 at the central control room of the factory through connection 124. A user 150 may access data center 121 through IoT service component 126 to monitor the detected temperature. In response to the detected temperature exceeds a threshold, the user 150 may take actions to lower the temperature (e.g., increasing a flow rate of a cooling pipeline sleeved onto the remote pipeline). In some embodiments, based on the machine learning capability, IoT service component 128 is configured to determine a threshold temperature based on detected high temperatures and the corresponding lowered temperatures.

In some embodiments, edge computing at edge gateway 112 is important because connection 115 may be unstable in severe weather conditions (e.g., hurricanes or typhoons) and the commands to release the pressure may not be able to transmit to edge gateway 112 in time. In some embodiments, there is a need to deploy IoT service component 128 at edge gateway 112 to determine the threshold pressure and locally issue commands to release the pressure at edge gateway 112. Conventionally, IoT service component 128 is specifically designed for homogenous IoT solution 120 and may not be compatible with components (e.g., edge gateway 112) of another homogeneous IoT solution 110.

In some embodiments, edge gateway 112 is configured as virtualized computing environment to run IoT service components originally designed for other IoT solutions (e.g., IoT service component 128). The virtualized computing environment includes edge gateway agent 130. Details of the edge gateway agents will be further described below.

Figure 2:
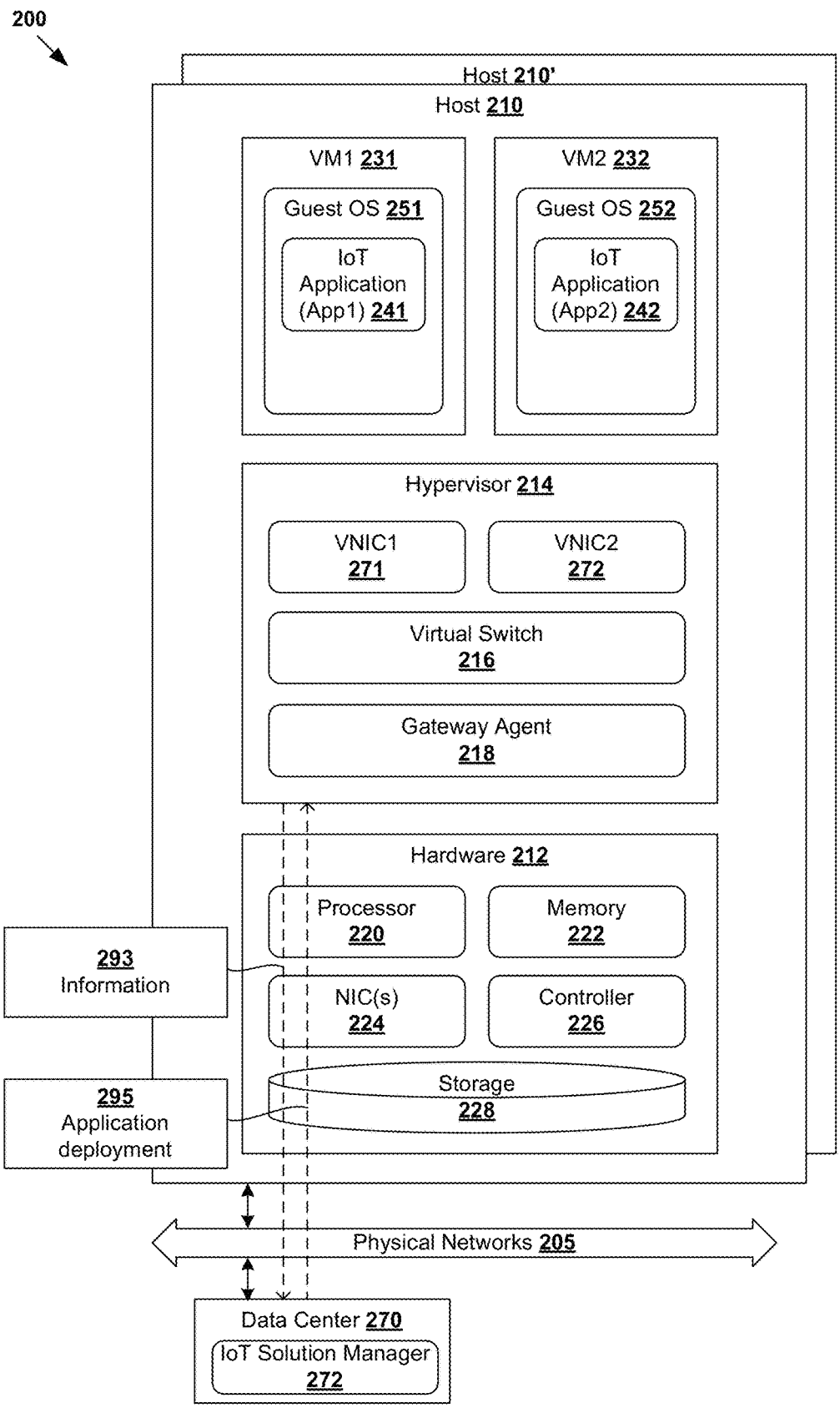
FIG. 2 is a flowchart of an example virtualized computing environment including an example edge gateway agent to facilitate the deployment of one or more IoT solutions in a hybrid environment.

In the example in FIG. 2, virtualized computing environment 200 includes multiple hosts (one shown for simplicity, e.g., edge gateway 112 in FIG. 1) that are inter-connected via physical network 205. Each host 210 includes suitable hardware 212 and virtualization software (e.g., hypervisor 214) to support various virtual machines 231-232. In practice, virtualized computing environment 200 may include any number of hosts, where each host may be supporting one or more virtual machines. In addition, these hosts may be disposed at the same premises (e.g., the offshore oil field set forth above). VM1 231 and VM2 232 each represents a software implementation of a physical machine.

Although examples of the present disclosure refer to virtual machines, it should be understood that a "virtual machine" running on host 210 is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. An application supported by a virtual machine may be a containerized application. The term "hypervisor" may refer generally to a software layer or component that supports the execution of multiple virtualized computing instances, including system-level software in guest virtual machines that supports namespace containers such as Docker, etc. In some embodiments, in conjunction with FIG. 1, IoT service component 128 is configured as compiled executable files or container images to run on a virtualized computing instance or workload (e.g., VM1 231 and VM2 232) in virtualized computing environment 200.

Hypervisor 214 maintains a mapping between underlying hardware 212 and virtual resources allocated to respective virtual machines 231-232. Hardware 212 includes suitable physical components, such as central processing unit(s) or processor(s) 220; memory 222; physical network interface controllers (NICs) 224; and storage disk(s) 228 accessible via storage controller(s) 226, etc. Virtual resources are allocated to each virtual machine 231/232 to support guest operating system (OS) 251/252 and IoT application 241/242. Corresponding to hardware 212, the virtual resources may include virtual CPU, virtual memory, virtual disk, virtual network interface controller (VNIC), etc. In the example in FIG. 2, virtual machines 231-232 are associated with respective VNICs 271-272 (also known as virtual Ethernet cards). Although one-to-one relationships are shown, one virtual machine may be associated with multiple VNICs (each VNIC having its own network address).

Hypervisor 214 further implements virtual switch 216 to handle egress packets from, and ingress packets to, respective virtual machines 231-232. The term "packet" may refer generally to a group of bits that can be transported together from a source to a destination, such as message, frame, segment, datagram, etc. For example in FIG. 2, VM1 231 and VM2 232 implement respective IoT applications 241-242 to interact with some IoT components (e.g., sensor 113, actuator 114 in FIG. 1 and other edge gateways 210 at the same premises) in an edge computing level through a short-ranged physical network 205 and other IoT components (e.g., data center 270) remotely in a cloud computing level through a long-ranged physical network 205. Data center 270 may support IoT solution manager 272 to manage and/or deploy IoT applications 241 and 242 in virtualized computing environment 200.

In some embodiments, hypervisor 214 is configured to deploy edge gateway agent 218 to communicate with IoT solution manager 272. Edge gateway agent 218 collects information 293 associated with host 210 and sends the collected information to IoT solution manager 272. In response, IoT solution manager 272 may issue a command to deploy IoT applications 241 and 242.

Figure 3:
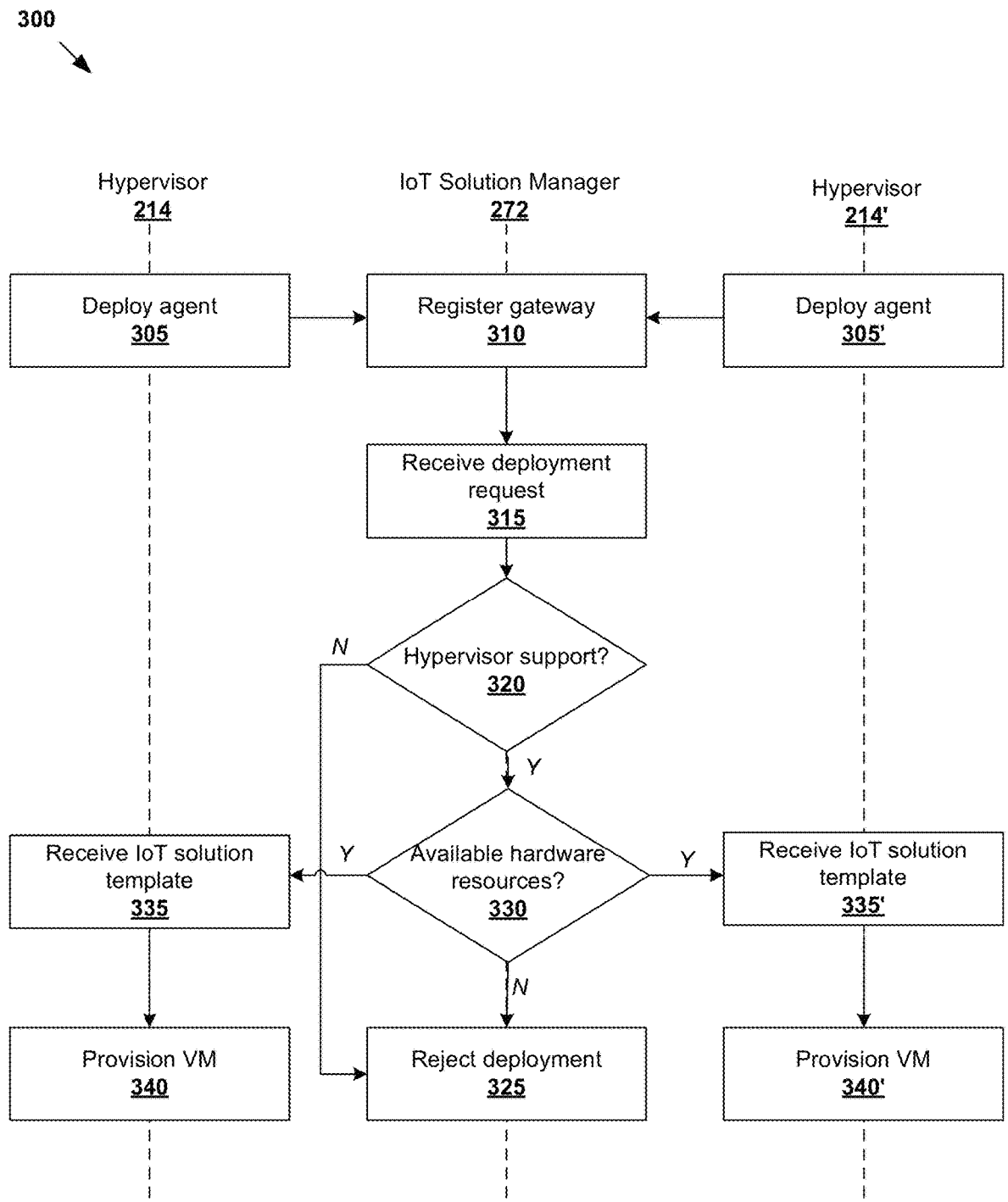
FIG. 3 is a schematic diagram illustrating an example detailed process to deploy one or more IoT solutions in a hybrid environment.

FIG. 3 is a flowchart of example detailed process 300 for deploying IoT application in virtualized computing environment 200. Example process 300 may include one or more operations, functions, or actions illustrated by one or more blocks, such as 305 to 340. The various blocks may be combined into fewer blocks, divided into additional blocks, and/or eliminated depending on the desired implementation. As will be described further below, hypervisor 214 on host 210, hypervisor 214' on host 210' and IoT solution manager 272 may implement example process 300.

In conjunction with FIG. 2, at 305 in FIG. 3, host 210, or more particularly hypervisor 214, deploys edge gateway agent 218 to facilitate IoT solution deployments. In some embodiments, edge gateway agent 218 is supported by the host OS of host 210. In some embodiments, edge gateway agent 218 is configured to push metadata 293 of host 210, including hardware and software information of host 210, to IoT solution manager 272. Edge gateway agent 218 is also configured to push system usage metrics 293 of host 210, including usages of hardware 212, to IoT solution manager 272. Edge gateway agent 218 is also configured to push location information of host 210 to IoT solution manager 272.

Similarly, at 305' in FIG. 3, host 210', or more particularly hypervisor 214', deploys edge gateway agent 218' to facilitate IoT solution deployments. In some embodiments, edge gateway agent 218' is supported by the host OS of host 210'. In some embodiments, edge gateway agent 218' is configured to push metadata 293' of host 210', including hardware and software information of host 210', to IoT solution manager 272. Edge gateway agent 218' is also configured to push system usage metrics 293' of host 210', including usages of hardware 212', to IoT solution manager 272. Edge gateway agent 218' is also configured to push location information of host 210' to IoT solution manager 272.

In some embodiments, edge gateway agent 218 may use passthrough approaches to collect metadata and system usage metrics 293 of one single host 210 or virtualization approaches to aggregate metadata and system usage metrics 293 and 293' of multiple hosts 210 and 210' disposed in one single premise.

At 310 in FIG. 3, IoT solution manager 272 is configured to register hosts 210 and 210' based on metadata and/or system usage metrics 293 and 293' as a potential resource to deploy an IoT solution implemented by one or more IoT applications.

At 315 in FIG. 3, IoT solution manager 272 is configured to receive an IoT solution deployment request. The IoT solution deployment request may include an IoT solution template to deploy the IoT solution. The IoT solution template may specify one or more requirements to deploy the IoT solution.

At 320 in FIG. 3, IoT solution manager 272 is configured to determine whether hypervisors 214 or 214' fulfils a first requirement specified in the IoT solution template. In response to a determination that hypervisors 214 or 214' does not fulfil the first requirement, at 325 in FIG. 3, IoT solution manager 272 is configured to reject the deployment of the IoT solution on hosts 210 or 210'.

In some embodiments, the first requirement may include, but not limited to, an architecture on which the IoT solution to be running and a communication protocol that the IoT solution uses. Some example architecture may include x86, arm64 and arm 32. Some example communication protocol may include HTTP2 and MQTT.

In conjunction with FIG. 1 and FIG. 2, hosts 210 or 210' may be edge gateway 112 disposed at a remote place, such as an offshore oil field and hypervisor 214 or 214' may be outdated to support the architecture on which the IoT solution to be running and the communication protocol that the IoT solution uses. In some embodiments, at 305 and 305' in FIG. 3, information associated with hypervisors 214 and 214' (e.g., vendor and version number) may be also collected by edge gateway agents 218/218' and sent to IoT solution manager 272. In some other embodiments, in response to a determination that hypervisors 214 or 214' fulfils the first requirement, at 330 in FIG. 3, IoT solution manager 272 is configured to determine whether edge gateways 214 or 214' fulfil a second requirement specified in the IoT solution template.

More specifically, at 330 in FIG. 3, IoT solution manager 272 is configured to determine whether hosts 210 and 210' are disposed in the same premises based on the first location information and the second location information.

In some embodiments, in response to the determination that hosts 210 and 210' are disposed in the same premises, IoT solution manager 272 is configured to aggregate system usage metrics 293 and 293' to determine whether aggregated available hardware resources of hosts 210 and 210' fulfil the second requirement. In response to the aggregated available hardware resources of hosts 210 and 210' does not fulfil the second requirement, at 325 in FIG. 3, IoT solution manager 272 is configured to reject deployment of the IoT solution.

In response to the aggregated available hardware resources of hosts 210 and 210' fulfil the second requirement, at 335 and 335' in FIG. 3, IoT solution manager 272 is configured to push the IoT solution template including compiled executable files or container images to hypervisor 214 and 214'. In response to receiving the IoT solution template, at 340 in FIG. 3, hypervisor 214 is configured to provision VM1 231 and VM2 232 according to the IoT solution template to run the compiled executable files or container images as IoT applications 241 and 242. Similarly, at 340' in FIG. 3, hypervisor 214' is configured to provision VM1 231' and VM2 232' according to the IoT solution template to run the compiled executable files or container images as IoT applications 241' and 242'.

In some other embodiments, in response to the determination that hosts 210 and 210' are disposed in different premises, IoT solution manager 272 is configured to determine whether available hardware resources of host 210 fulfils the second requirement based on system usage metrics 293. In response to the available hardware resources of host 210 does not fulfil the second requirement, at 325 in FIG. 3, IoT solution manager 272 is configured to reject deployment of the IoT solution on host 210. Similarly, IoT solution manager 272 is also configured to determine whether available hardware resources of host 210' fulfill the second requirement based on system usage metrics 293'. In response to the available hardware resources of host 210' does not fulfil the second requirement, at 325 in FIG. 3, IoT solution manager 272 is configured to reject deployment of the IoT solution on host 210'.

In response to the available hardware resources of host 210 fulfils the second requirement, at 335 in FIG. 3, IoT solution manager 272 is configured to push the IoT solution template including compiled executable files or container images to hypervisor 214. In response to receiving the IoT solution template, at 340 in FIG. 3, hypervisor 214 is configured to provision VM1 231 and VM2 232 according to the IoT solution template to run the compiled executable files or container images as IoT applications 241 and 242.

Similarly, in response to the available hardware resources of host 210' fulfils the second requirement, at 335' in FIG. 3, IoT solution manager 272 is configured to push the IoT solution template including compiled executable files or container images to hypervisor 214'. In response to receiving the IoT solution template, at 340' in FIG. 3, hypervisor 214' is configured to provision VM1 231' and VM2 232' according to the IoT solution template to run the compiled executable files or container images as IoT applications 241' and 242'.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5. For example, a computer system may be deployed in virtualized computing environment 100 to perform the functionality of host 110 or server 180.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to deploy an Internet of Things (IoT) solution in a hybrid environment, wherein the method comprises:
    deploying a first agent application on a first edge gateway of a first vendor, by the first edge gateway, wherein the first agent application is configured to collect a first set of information associated with the first edge gateway;
    deploying a second agent application on a second edge gateway of a second vendor, by the second edge gateway, wherein the second agent application is configured to collect a second set of information associated with the second edge gateway; and
    in response to a determination of a first virtualized computing environment on the first edge gateway or a second virtualized computing environment on the second edge gateway fulfils a first requirement of a template to deploy the IoT solution, receiving the template at the first edge gateway or the second edge gateway from a management entity to deploy the IoT solution in the first virtualized computing environment and on the first edge gateway, the second virtualized computing environment and on the second edge gateway, or both.

2. The method of claim 1, wherein the first set of information includes a first virtualization software information corresponding to the first requirement, and the first virtualization software is running on the first edge gateway to support the first virtualized computing environment.

3. The method of claim 2, wherein the first virtualization software information includes the first vendor and a first version of the first virtualization software and the second virtualization software information includes the second vendor and a second version of the second virtualization software.

4. The method of claim 1, wherein the first set of information includes a first location information of the first edge gateway and the second set of information includes a second location information of the second edge gateway, the method further comprising:
    in response to a determination that the first edge gateway and the second edge gateway are disposed in the same premises,
    aggregating available hardware resources of the first edge gateway included in the first set of information and available hardware resources of the second edge gateway included in the second set of information to fulfil a second requirement of the template; and
    deploying the IoT solution in the first virtualized computing environment and the second virtualized computing environment.

5. The method of claim 4, the method further comprising:
    in response to a determination that the first edge gateway is disposed in a first premises and the second edge gateway is disposed in a second premises,
    deploying the IoT solution in the first virtualized computing environment in response to available hardware resources of the first edge gateway included in the first set of information fulfils the second requirement of the template.

6. The method of claim 4, the method further comprising:
    in response to a determination that the first edge gateway is disposed in a first premises and the second edge gateway is disposed in a second premises,
    rejecting to deploy the IoT solution in the second virtualized computing environment in response to available hardware resources of the second edge gateway included in the second set of information does not fulfil the second requirement of the template.

7. A non-transitory computer-readable storage medium that includes a set of instructions which, in response to execution by a processor of a host, cause the host to deploy an Internet of Things (IoT) solution in a hybrid environment, wherein the method comprises:
    deploying a first agent application on a first edge gateway of a first vendor, by the first edge gateway, wherein the first agent application is configured to collect a first set of information associated with the first edge gateway;
    deploying a second agent application on a second edge gateway of a second vendor, by the second edge gateway, wherein the second agent application is configured to collect a second set of information associated with the second edge gateway; and
    in response to a determination of a first virtualized computing environment on the first edge gateway or a second virtualized computing environment on the second edge gateway fulfils a first requirement of a template to deploy the IoT solution, receiving the template at the first edge gateway or the second edge gateway from a management entity to deploy the IoT solution in the first virtualized computing environment and on the first edge gateway, the second virtualized computing environment and on the second edge gateway, or both.

8. The non-transitory computer-readable storage medium of claim 7, wherein the first set of information includes a first virtualization software information corresponding to the first requirement, and the first virtualization software is running on the first edge gateway to support the first virtualized computing environment.

9. The non-transitory computer-readable storage medium of claim 8, wherein the first virtualization software information includes the first vendor and a first version of the first virtualization software and the second virtualization software information includes the second vendor and a second version of the second virtualization software.

10. The non-transitory computer-readable storage medium of claim 7, wherein the first set of information includes a first location information of the first edge gateway and the second set of information includes a second location information of the second edge gateway, the method further comprising:
  in response to a determination that the first edge gateway and the second edge gateway are disposed in the same premises,
  aggregating available hardware resources of the first edge gateway included in the first set of information and available hardware resources of the second edge gateway included in the second set of information to fulfil a second requirement of the template; and
  deploying the IoT solution in the first virtualized computing environment and the second virtualized computing environment.

11. The non-transitory computer-readable storage medium of claim 10, wherein the method further comprises:
  in response to a determination that the first edge gateway is disposed in a first premises and the second edge gateway is disposed in a second premises,
  deploying the IoT solution in the first virtualized computing environment in response to available hardware resources of the first edge gateway included in the first set of information fulfils the second requirement of the template.

12. The non-transitory computer-readable storage medium of claim 10, wherein the method further comprises:
  in response to a determination that the first edge gateway is disposed in a first premises and the second edge gateway is disposed in a second premises,
  rejecting to deploy the IoT solution in the second virtualized computing environment in response to available hardware resources of the second edge gateway included in the second set of information does not fulfil the second requirement of the template.

13. A system configured to deploy an Internet of Things (IoT) solution in a hybrid environment, wherein the system comprises:
  a first processor; and
  a first non-transitory computer-readable medium having stored thereon instructions that, in response to execution by the first processor, cause the first processor to:
  deploy a first agent application on a first edge gateway of a first vendor, by the first edge gateway, wherein the first agent application is configured to collect a first set of information associated with the first edge gateway; and
  in response to a determination of a first virtualized computing environment on the first edge gateway fulfils a first requirement of a template to deploy the IoT solution, receiving the template at the first edge gateway from a management entity to deploy the IoT solution in the first virtualized computing environment and on the first edge gateway.

14. The system of claim 13, further comprising:
  a second processor; and
  a second non-transitory computer-readable medium having stored thereon instructions that, when executed by the second processor, cause the second processor to:
  deploy a second agent application on a second edge gateway of a second vendor, by the second edge gateway, wherein the second agent application is configured to collect a second set of information associated with the second edge gateway; and
  in response to a determination of a second virtualized computing environment on the second edge gateway fulfils the first requirement of the template to deploy the IoT solution, receiving the template at the second edge gateway from a management entity to deploy the IoT solution in the second virtualized computing environment and on the second edge gateway.

15. The system of claim 14, wherein the first set of information includes a first virtualization software information corresponding to the first requirement, and the first virtualization software is running on the first edge gateway to support the first virtualized computing environment.

16. The system of claim 15, wherein the first virtualization software information includes the first vendor and a first version of the first virtualization software and the second virtualization software information includes the second vendor and a second version of the second virtualization software.

17. The system of claim 14, wherein the first set of information includes a first location information of the first edge gateway and the second set of information includes a second location information of the second edge gateway, the first non-transitory computer-readable medium having stored thereon additional instructions that, when executed by the first processor, cause the first processor to:
  in response to a determination that the first edge gateway and the second edge gateway are disposed in the same premises,
  aggregate available hardware resources of the first edge gateway included in the first set of information and available hardware resources of the second edge gateway included in the second set of information to fulfil a second requirement of the template; and
  deploy the IoT solution in the first virtualized computing environment.

18. The system of claim 17, the first non-transitory computer-readable medium having stored thereon additional instructions that, when executed by the first processor, cause the first processor to:
  in response to a determination that the first edge gateway is disposed in a first premises and the second edge gateway is disposed in a second premises,
  deploy the IoT solution in the first virtualized computing environment in response to available hardware resources of the first edge gateway included in the first set of information fulfils the second requirement of the template.

19. The system of claim 17, the first non-transitory computer-readable medium having stored thereon additional instructions that, when executed by the first processor, cause the first processor to:
- in response to a determination that the first edge gateway is disposed in a first premises and the second edge gateway is disposed in a second premises,
- reject to deploy the IoT solution in the first virtualized computing environment in response to available hardware resources of the first edge gateway included in the first set of information does not fulfil the first requirement of the template.

\* \* \* \* \*